US008116581B2

(12) United States Patent
Sun et al.

(10) Patent No.: US 8,116,581 B2
(45) Date of Patent: Feb. 14, 2012

(54) EFFICIENT IMAGE REPRESENTATION BY EDGES AND LOW-RESOLUTION SIGNAL

(75) Inventors: Tiantian Sun, Beijing (CN); Ji-Zheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 11/770,154

(22) Filed: Jun. 28, 2007

(65) Prior Publication Data

US 2009/0003720 A1    Jan. 1, 2009

(51) Int. Cl.
*G06K 9/48* (2006.01)
(52) U.S. Cl. ........ 382/242; 382/197; 382/237; 382/260; 382/199; 348/14.13
(58) Field of Classification Search .............. 382/242, 382/197, 237, 266, 199, 260; 348/14.13
See application file for complete search history.

(56) References Cited

U.S. PATENT DOCUMENTS

| | | | | |
|---|---|---|---|---|
| 3,987,412 | A * | 10/1976 | Morrin, II | 382/242 |
| 4,777,651 | A * | 10/1988 | McCann et al. | 382/242 |
| 4,896,364 | A * | 1/1990 | Lohscheller | 382/162 |
| 5,392,365 | A | 2/1995 | Steinkirchner | |
| 5,600,772 | A * | 2/1997 | Zhou et al. | 345/170 |
| 5,761,341 | A * | 6/1998 | Go | 382/232 |
| 5,774,595 | A * | 6/1998 | Kim | 382/232 |
| 5,787,203 | A * | 7/1998 | Lee et al. | 382/232 |
| 5,790,269 | A * | 8/1998 | Masaki et al. | 358/447 |
| 5,978,513 | A * | 11/1999 | Murayama | 382/242 |
| 6,055,337 | A * | 4/2000 | Kim | 382/242 |
| 6,259,803 | B1 | 7/2001 | Wirtz et al. | |
| 6,330,367 | B2 | 12/2001 | Go | |
| 6,370,192 | B1 | 4/2002 | Pearlstein et al. | |
| 6,400,844 | B1 | 6/2002 | Fan et al. | |
| 6,477,279 | B2 | 11/2002 | Go | |
| 6,501,860 | B1 * | 12/2002 | Charrier et al. | 382/240 |
| 6,542,545 | B1 * | 4/2003 | Vetro et al. | 375/240.08 |
| 6,904,176 | B1 | 6/2005 | Chui et al. | |
| 6,990,248 | B2 * | 1/2006 | Pardas et al. | 382/243 |
| 7,023,487 | B1 | 4/2006 | Adams | |
| 7,139,442 | B2 | 11/2006 | Ebner et al. | |
| 7,280,700 | B2 * | 10/2007 | Tourapis et al. | 382/238 |

(Continued)

FOREIGN PATENT DOCUMENTS

JP    2006246351 A    9/2006

(Continued)

OTHER PUBLICATIONS

A rate distortion analysis—drawings, Neuhoff et al., IEEE, 0018-9448, 1985, pp. 53-68.*

(Continued)

*Primary Examiner* — Jayesh A Patel
(74) *Attorney, Agent, or Firm* — Lee & Hayes, PLLC (57) ABSTRACT

An exemplary method for encoding an image includes receiving image data, detecting edges in the image data, selecting at least some of the detected edges, encoding the selected edges as selected edge information, down-sampling the image data, encoding the down-sampled image as down-sampled image information and multiplexing the selected edges information and the down-sampled image information. In such a method, the selected edges information and the down-sampled image information can be stored as an encoded image file. Other exemplary methods, devices, systems are also disclosed.

27 Claims, 10 Drawing Sheets

U.S. PATENT DOCUMENTS

| | | | |
|---|---|---|---|
| 7,313,285 B2 * | 12/2007 | Aliaga et al. | 382/243 |
| 7,388,988 B2 * | 6/2008 | Luo | 382/199 |
| 2003/0132947 A1 * | 7/2003 | Luo | 345/619 |
| 2003/0132957 A1 * | 7/2003 | Ullmann et al. | 345/738 |
| 2004/0008899 A1 * | 1/2004 | Tourapis et al. | 382/251 |
| 2004/0114817 A1 * | 6/2004 | Jayant et al. | 382/239 |
| 2004/0179617 A1 * | 9/2004 | Cai et al. | 375/240.26 |
| 2004/0184669 A1 | 9/2004 | Tan et al. | |
| 2005/0012648 A1 * | 1/2005 | Marpe et al. | 341/107 |
| 2005/0069217 A1 * | 3/2005 | Mukherjee | 382/266 |
| 2008/0112481 A1 * | 5/2008 | Hsaing et al. | 375/240.03 |

FOREIGN PATENT DOCUMENTS

| | | |
|---|---|---|
| JP | 2007288815 A | 11/2007 |

OTHER PUBLICATIONS

PCT Search Report for PCT Application No. PCT/US2008/067814, mailed Dec. 16, 2008 (10 pages).

Allebach, et al., "Edge-directed interpolation", retrieved on Apr. 25, 2007, at <<http://ieeexplore.ieee.org/xpl/freeabs_all.jsp?isnumber=12210&arnumber=560768>>, IEEE, 2006, p. 1.

Bala, et al., "Combining Edges and Points for Interactive High-Quality Rendering", available at least as early as Apr. 23, 2007, at <<http://www.graphics.cornell.edu/pubs/2003/BWG03.pdf>>, ACM SIGGRAPH, 2003, pp. 1-10.

Greenspan, et al., "Image Enhancement by Nonlinear Extrapolation in Frequency Space", available at least as early as Apr. 23, 2007, at http://www.eng.tau.ac.il/~hayit/publications/Enhancement2.pdf>>, IEEE, vol. 9, No. 6, Jun. 2000, pp. 1035-1048.

Mallat, et al., "Compact Image Coding From Edges with Wavelets", retrieved on Apr. 25, 2007, at <<http://ieeexplore.ieee.org/xpl/freeabs_all.jsp?arnumber=150970>>, IEEE, 2006, p. 1.

Chinese Office Action mailed Sep. 21, 2011 for Chinese patent application No. 200880022303.6, a counterpart foreign application of U.S. Appl. No. 11/770,154, 11 pages.

* cited by examiner

EXEMPLARY MODELS 800

$P_0$ IS HORIZONTAL OR VERTICAL 802

| 0_0 | $P_0 = P_1 = L$ |
|---|---|
| 0_1 | $P_0 = P_1, L = P_0 +/- 1$ |
| 0_2 | $P_0 = L, P_1 = P_0 +/- 1$ |
| 0_3 | $P_1 = L = P_0 +/- 1$ |
| 0_4 | $P_0! = P_1! = L$ |

$P_0$ IS DIAGONAL 804

| 1_0 | $P_0 = P_1 = L$ |
|---|---|
| 1_1 | $P_0 = P_1, L = P_0 +/- 1$ |
| 1_2 | $P_0 = P_1, L = P_0 +/- 2$ |
| 1_3 | $P_0 = L, P_1 = P_0 +/- 1$ |
| 1_4 | $P_0 = L, P_1 = P_0 +/- 2$ |
| 1_5 | $P_1 = L = P_0 +/- 1$ |
| 1_6 | $P_1 = L = P_0 +/- 2$ |
| 1_7 | $P_0! = P_1! = L$ |

EFFICIENT IMAGE REPRESENTATION BY EDGES AND LOW-RESOLUTION SIGNAL

BACKGROUND

Media content (e.g. images and videos) often exist in compressed form to reduce storage space and to facilitate transport. For example, a media server typically accesses compressed media and streams the compressed media to a client capable of decompressing the media for presentation. Compression is extensively used in transmission, storage and playback in various applications.

The compressed media are usually generated by the following process. First, raw media contents are predicted from their temporal and/or spatial neighbors. Second, the predicted residues are transformed to frequency domain. At last, the coefficients are quantized and entropy coded to generate the compressed representation. In general, natural images and videos contain rich edges and contours, which still exist after prediction. These edges constitute the high-frequency part of media, which are difficult to encode because the energy of signal becomes somewhat scattered after transformation to the frequency domain. Often edges and contours contain important structural media content, however, transform-based representation has a problem to preserve and utilize edges and contours.

For example, consider "mosquito noise", which is a type of edge busyness distortion that appears near crisp edges of objects in MPEG and other video frames compressed using lossy techniques that rely on the discrete cosine transform (DCT). More specifically, mosquito noise occurs at decompression as the decoding engine approximates discarded data by inverting the transform model. In video, mosquito noise appears as frame-to-frame random aliasing at the edges (e.g., resembling a mosquito flying around a person's head where edges exist between the person's head and a solid background). In general, as TV and computer screens get larger, mosquito noise and other artifacts become more noticeable.

For image compression techniques that rely solely on the DCT (a Fourier-related transform similar to the discrete Fourier transform, but using only real numbers), edges and contours are totally invisible. Another type of transform, the wavelet transforms, is a time-frequency transform, however, wavelet based compression techniques only use structure information in context models for arithmetic coding. Consequently, DCT and wavelet techniques fall short in their ability to represent media in a manner that preserves edge and contour information. Further, in both DCT based and wavelet based compression techniques, it is not easy to access structure information in a compressed stream or a compressed file. Techniques are presented herein that allow for preservation of edge and contour information as well as access to such information.

SUMMARY

An exemplary method for encoding an image includes receiving image data, detecting edges in the image data, selecting at least some of the detected edges, encoding the selected edges as selected edge information, down-sampling the image data, encoding the down-sampled image as down-sampled image information and multiplexing the selected edges information and the down-sampled image information. In such a method, the selected edges information and the down-sampled image information can be stored as an encoded image file. Other exemplary methods, devices, systems are also disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Overview

An exemplary technique preserves edge and contour information using transform-based and pixel-based approaches. This technique down-scales selected low-frequency regions for representation in a frequency domain and maintains selected high-frequency regions in a pixel domain. Thus, for a given image, each low-frequency part of the image can be described by a low-resolution signal that can be efficiently processed by conventional transform-based approaches while each high-frequency part of the image can be described by edges extracted at high resolution for processing directly in the pixel domain. When media content is reconstructed, the high-frequency signal can be used to interpolate the down-scaled image from low resolution to, for example, its original resolution. Since edge information is a separated component of the media representation, it can be made available for any of a variety of purposes (e.g., indexing, searches, classification, machine vision, scientific analyses, etc.).

Various techniques also allow for access to such structural information in compressed stream. For example, a search application may access this information to perform better media searches.

Various figures include blocks, which are typically software modules for performing one or more actions. For example, a block may be processor executable instructions that, upon execution, perform one or more actions. In certain instances, such blocks may be implemented as hardware or hardware and software. With respect to hardware, MPEG-4 encoder and/or decoder chips are examples of hardware commonly used for TV set-top boxes, DVD players, DVD recorders, digital media adapters, portable media players, etc.

Still Images

Various conventional still image compression techniques are defined by the Joint Photographic Experts Group (JPEG). A baseline JPEG lossy process, which is typical of many DCT-based processes, involves encoding by: (i) dividing each component of an input image into 8×8 blocks; (ii) performing a two-dimensional DCT on each block; (iii) quantizing each DCT coefficient uniformly; (iv) subtracting the quantized DC coefficient from the corresponding term in the previous block; and (v) entropy coding the quantized coefficients using variable length codes (VLCs). Decoding is performed by inverting each of the encoder operations in the reverse order. For example, decoding involves: (i) entropy decoding; (ii) performing a 1-D DC prediction; (iii) performing an inverse quantization; (iv) performing an inverse DCT transform on 8×8 blocks; and (v) reconstructing the image based on the 8×8 blocks. While the process is not limited to 8×8 blocks, square blocks of dimension 2n×2n, where "n" is an integer, are preferred.

Video

Various conventional video compression techniques are defined by the Moving Pictures Experts Group (MPEG), which provides a fairly widespread standard for digital terrestrial, cable and satellite TV, DVDs, digital video recorders (DVRs), etc. MPEG uses lossy DCT compression within each frame similar to JPEG. MPEG also uses interframe coding, which further compresses the data by encoding only the differences between periodic frames. With interframe coding, a video sequence can be represented as key frames that contain full content and delta frames, which are encoded with incremental differences between frames. For example, a delta frame typically includes information about image blocks that have changed as well as motion vectors (e.g., bidirectional, etc.), or information about image blocks that have moved since the previous frame. Delta frames tend to be most compressed in situations where video content is quite static.

Edge Noise

As explained in the Background section, lossy DCT compression does not adequately handle edges and contours. In particular, as compression ratio increases, high-frequency content noise increases. A type of distortion known as "edge busyness" finds distortion concentrated at the edges of objects. Edge busyness can be further characterized by temporal and spatial characteristics of media content. For example, edge busyness occurs when a reconstructed edge varies slightly in its position from one scan line to another due to quantizer fluctuations. As already mentioned, a more specific type of edge busyness is mosquito noise, a distortion that appears near crisp edges of objects in MPEG and other video frames that are compressed using DCT.

Figure 1:
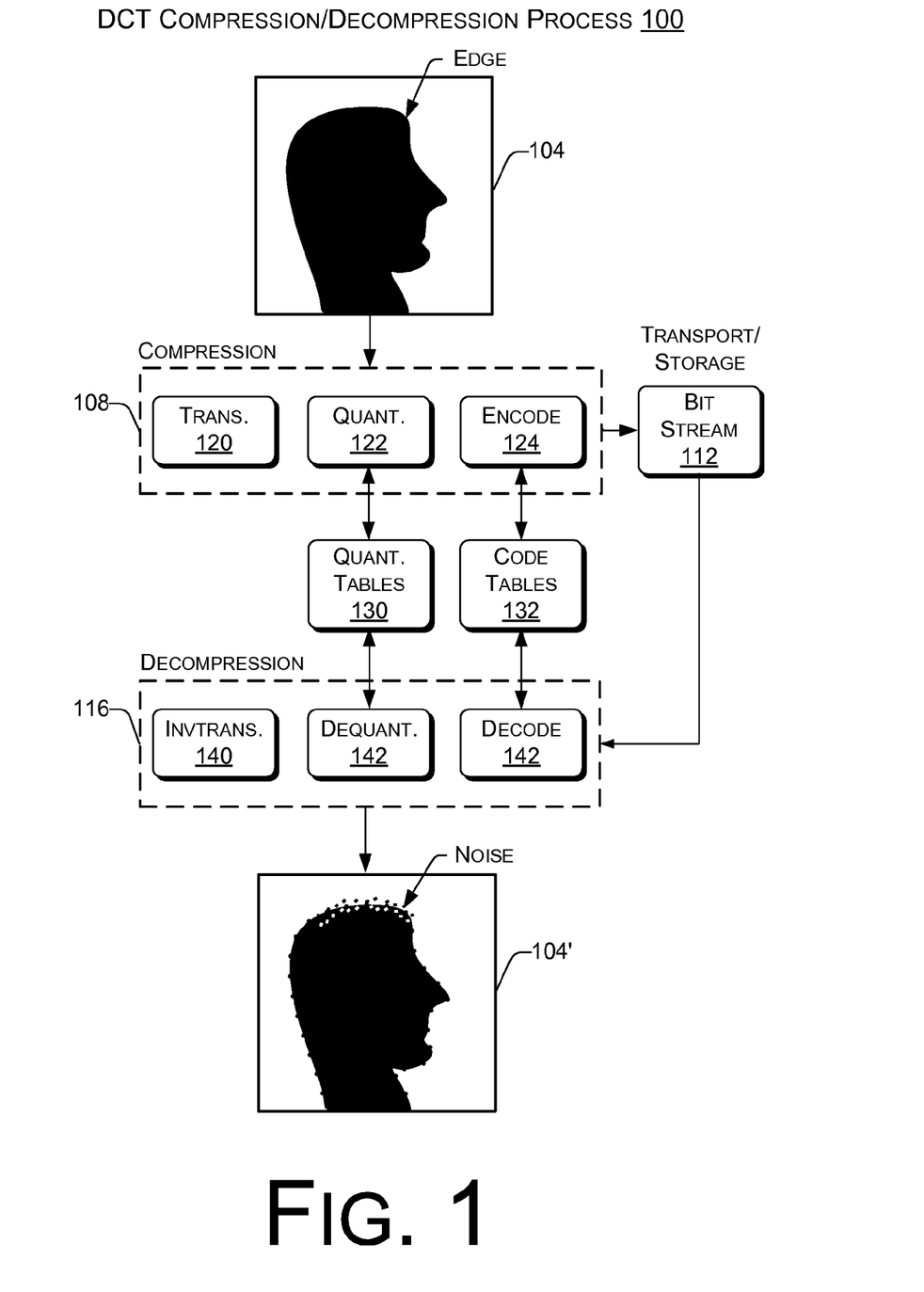
FIG. 1 is a diagram of a conventional lossy compression/decompression process that uses the DCT algorithm where edge noise may appear in an image reconstructed from a compressed image.

FIG. 1 shows a diagram to illustrate edge noise generated by a lossy DCT compression/decompression process 100. The process commences with an original image 104 to be compressed using lossy DCT compression 108. The compression process 108 includes a transform algorithm 120, an algorithm to quantize transform coefficients 122, and an algorithm to encode quantized coefficients 124 (e.g., entropy encoder). In this example, the compression process 108 uses a quantization table 130 and a code table 132 for support. The compressed image may be transmitted as a bit stream 112 to destination where decompression occurs.

With respect to the bit stream 112, information may be in the form of data packets. Various media systems (e.g., WINDOWS® Media Player) can receive media in a packetized format. In addition, header and/or other information are optionally included wherein the information relates to such packets, e.g., padding of packets, bit rate and/or other format information (e.g., error correction, etc.).

The decompression process 116 generally involves decoding quantized coefficients 144, dequantizing coefficients 142, and performing an inverse transform 140. As already explained, where edges exist, especially high contrast edges, "energy" can be dispersed by transformation to the frequency domain. In turn, when the inverse transform is performed, the dispersed energy can end up in a pixel other than the corresponding original pixel. The reconstructed image 104' illustrates this as noise along an edge, noting that such noise may be present along all edges, especially high contrast edges.

Exemplary Method

Figure 2:
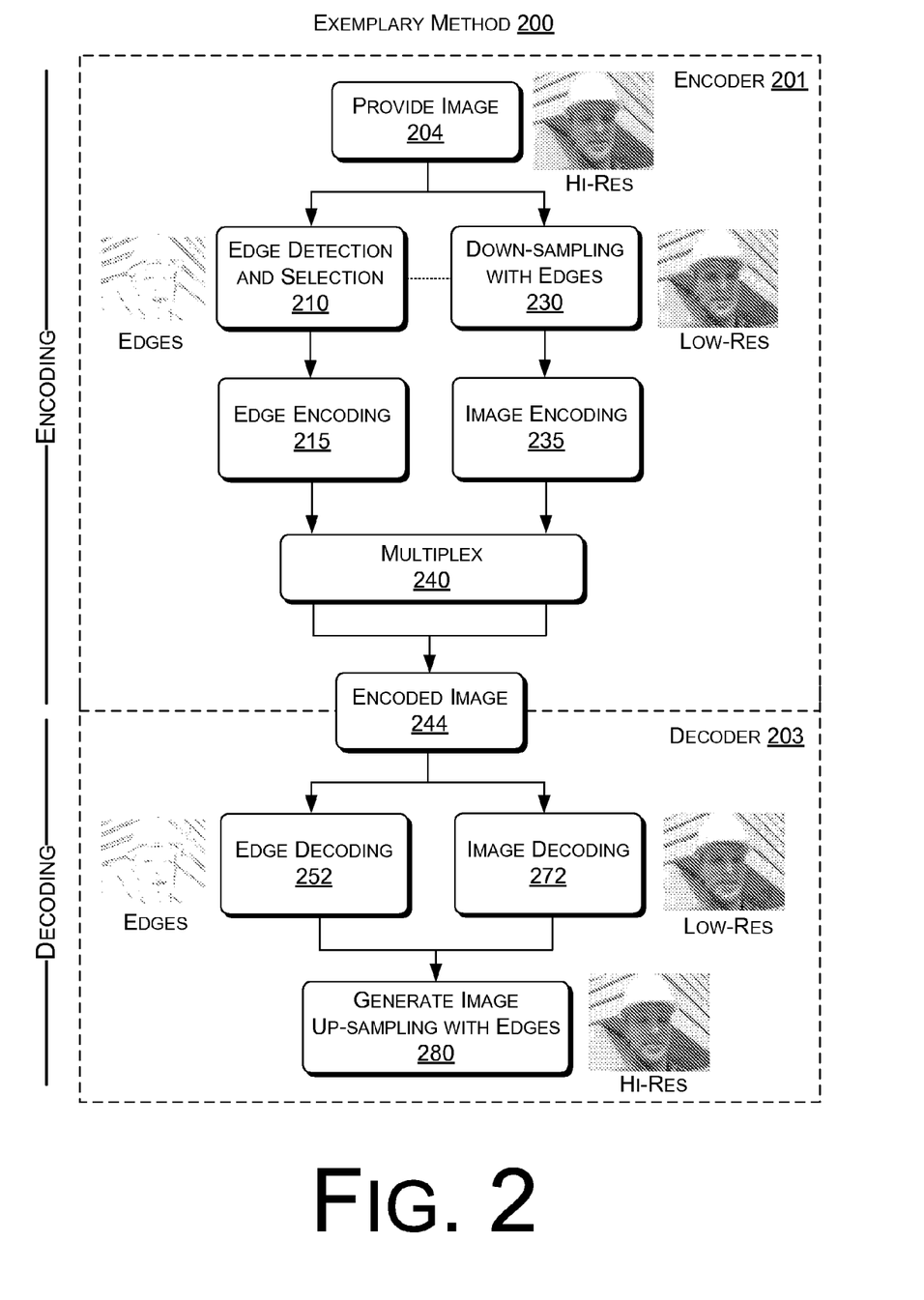
FIG. 2 is a diagram of an exemplary method for encoding and decoding an image that uses edge encoding and decoding in conjunction with image encoding and decoding.

FIG. 2 shows an exemplary method 200 for representing an image by edges and a low-resolution signal. The method 200 includes an encoding phase performed by an encoder 201 and a decoding phase performed by a decoder 203. For example, a media server can include the encoder 201 and a client computing device can include the decoder 203. In such an example, an encoded image 244 can be transmitted from the media server to the client computing device as a file or a stream via a network. As described herein, the encoding phase can include one or more pre-processing steps and specific encoding steps and the decoding phase can include specific decoding steps and one or more post-processing steps.

The method 200 is shown with reference to the first image from a standard test video file, commonly known as the "Foreman" test video (see, e.g., test media associated with the Consultative Committee on International Telegraphy and Telephony). This image is segregated into a low-frequency part and a high-frequency part, noting that each of the low-frequency part and the high-frequency part can represent various regions of the images. More specifically, the high-frequency part represents edges and the low-frequency part represents various regions that reside between edges. Thus, the method 200 includes a high-frequency process (left side of FIG. 2), a low-frequency process (right side of FIG. 2) and processes to distinguish and to combine low- and high-frequency information (center of FIG. 2).

In the encoding phase, an edge detection and selection block 210 detects edges in the original image, thins these edges to a predetermined width (e.g., a one-pixel width), and then selects some of the edges through a use of a rate-distortion criterion. Overall, the detection and selection block 210 defines the high-frequency part of the image in a manner that can be described losslessly per an edge encoding block 215. Details of an exemplary method for edge encoding are discussed further below.

With respect to the low-frequency part of the image, a down-sampling block 230 down-samples the image with edges to create a low-resolution image. The down-sampling process can operate with assistance of the selected edges (see dashed line from block 210 to block 230). After down-sampling, an image encoding block 235 encodes the low-resolution image.

As indicated in FIG. 2, the selected edges and the low-resolution image are encoded (i.e., compressed) and multiplexed by a multiplex block 240 to form an encoded image 244. The encoded image 244 may be a data file suitable for storage or transmission or a data stream (e.g., packetized or other format). Where a video is provided, various images of the video may be processed using the encoder 201 to generate an encoded video.

As described in more detail below, a process for encoding selected edges 215 can encode a selected edge as a start point and a series of chain direction values (e.g., a chain code). This information may be stored as a data structure accessible by a search engine and/or it may be used to index an image based on the selected edge information (e.g., start point information and chain direction information). For example, indexing may index an image based on edge characteristics such as number of edges (e.g., based on information in a binary start point map) and edge length (e.g., number of values in a chain code).

As mentioned, conventional encoding techniques do not encode edges separately, consequently, edge information is not readily available for indexing, searches, etc. Consider machine vision example where images are acquired for quality control. Such images may include edge information that relates to certain quality aspects while other "non-edge" regions are useful for other quality aspects. In this example, separate edge encoding allows a search algorithm to uncover edge abnormalities (e.g., number of start points and/or short average edge length, which may correspond to a broken product) based on edge information alone. In the instance a particular image is identified as associated with a potentially defective product, the down-sampled information may be used to reconstruct a high-resolution image to more fully understand the defect (see, e.g., description of decoding phase below.

The decoding phase of the method 200 includes the decoder 244 receiving the encoded image 244. The decoding process is bifurcated into an edge decoding step performed by an edge decoding block 252 and an image decoding step performed by an image decoding block 272. Accordingly, two kinds of encoded data are received: one is the low-resolution image, which can be decoded using corresponding image decoding scheme 272 and the other is the edges, which can be decoded using an exemplary edge decoding scheme 252. After edge decoding 252 and image decoding 272, a generation block 280 generates a high-resolution image by up-sampling the decoded low-resolution image with the decoding edges. Thus, the decoding phase of the method 200 can decode selected edges information and down-sampled image information to generate an up-sampled image having a resolution greater than the down-sampled image.

Overall, the method 200 provides for efficient image representation by edges and a low-resolution signal. Such a technique can reduce noise associated with edges, allow for indexing based on edge characteristics, etc.

Edge Detection

Figure 3:
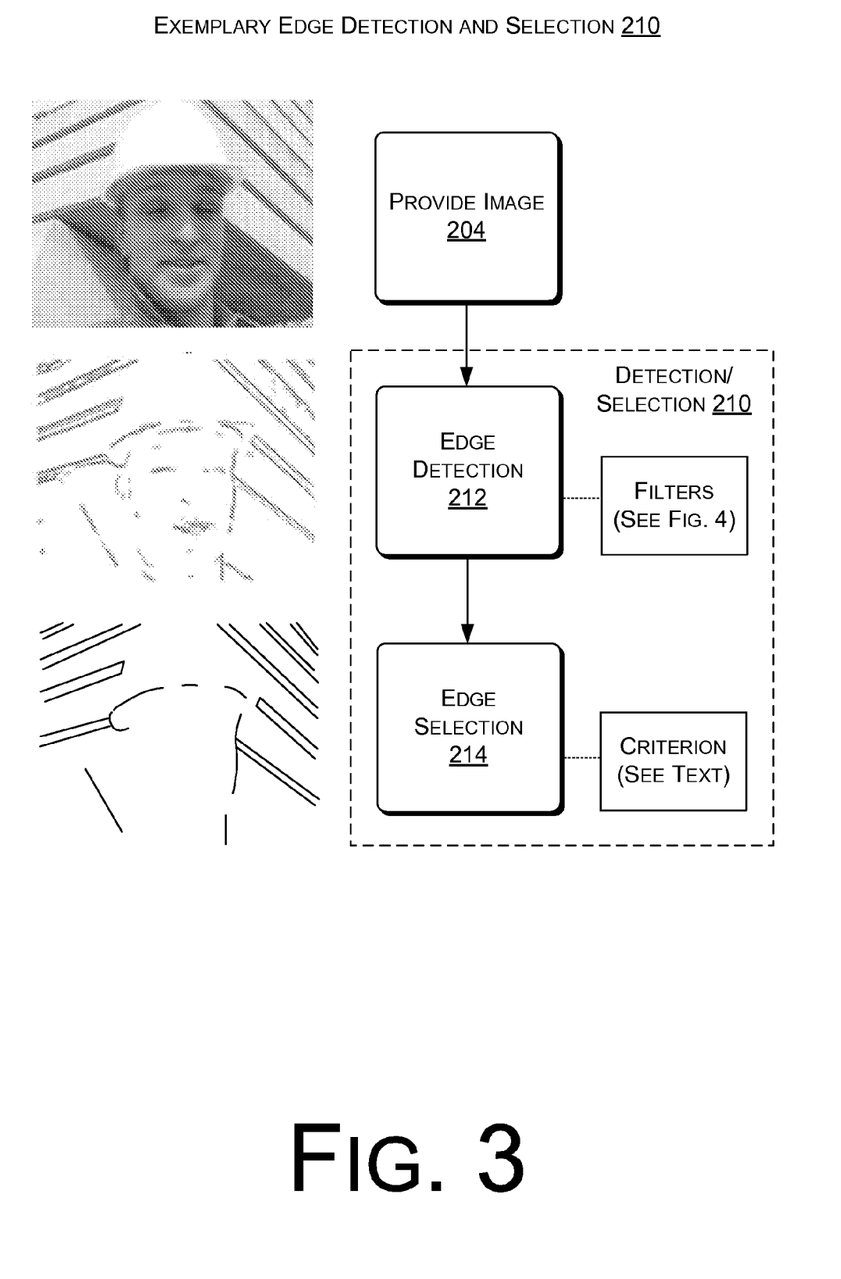
FIG. 3 is a diagram of an exemplary technique for edge detection and edge selection where edge selection occurs according to a rate-distortion criterion.

FIG. 3 shows details of the detection and selection block 210 of the method 200. More specifically, FIG. 3 shows an edge detection block 212 and an edge selection block 214 along with a high-resolution Foreman image, edges of the Foreman image and selected edges of the Foreman image. The edge detection block 212 is described with reference to a schematic of an edge region 402 of FIG. 4 (e.g., an edge in the Foreman image). Generally, an edge region in natural images can be simply modeled as a gradual region of brightness, as indicated by the open circles (or pixels), the shaded circles and the darkened circles of the edge region 402. The edge region 402 includes a single edge and double edge points within a width or scale of from four pixels to three pixels.

Figure 4:
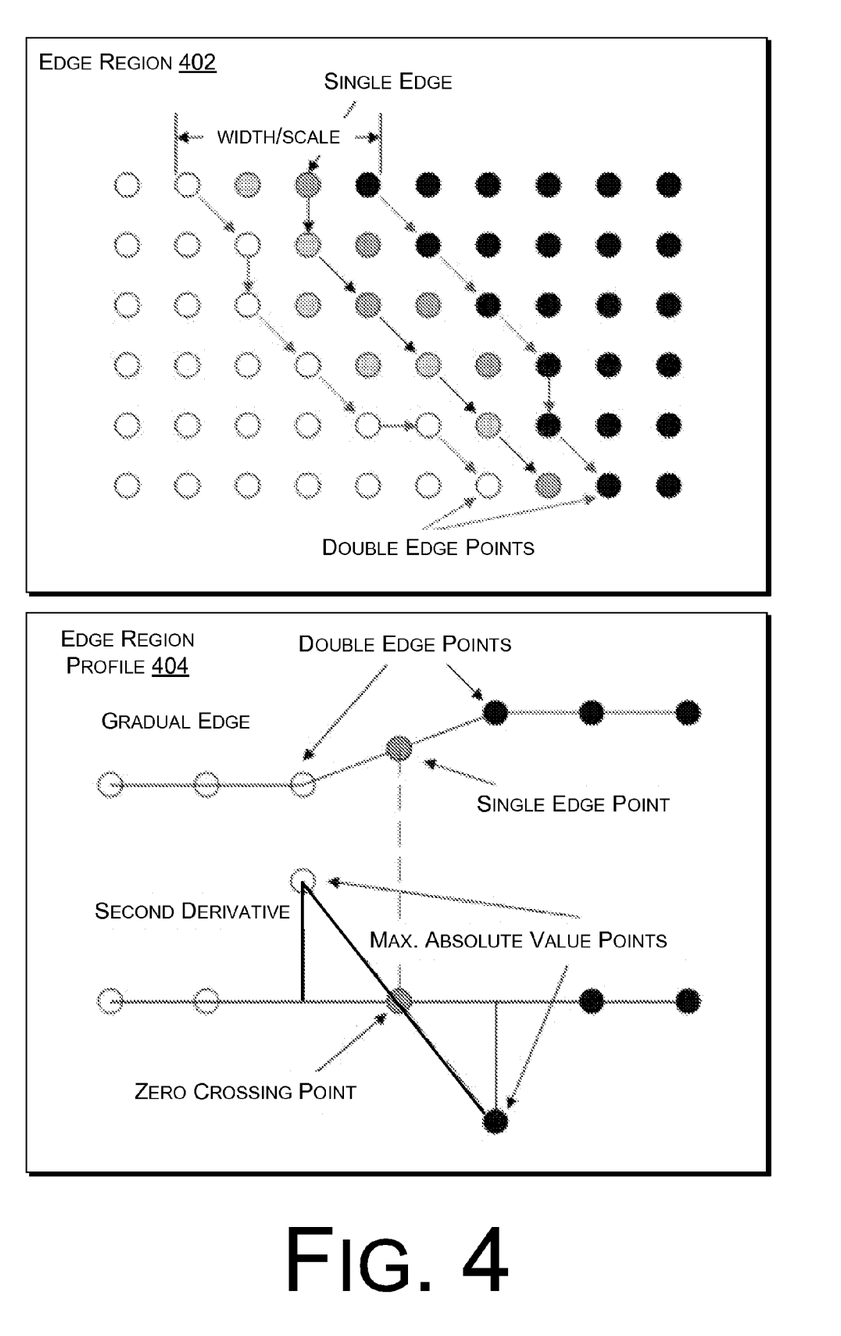
FIG. 4 is a diagram of an edge region, a profile of the edge region and the second derivative of the profile of the edge region.

Most classical edge detection techniques define the concept of an edge as the zero-crossing positions of a Laplacian of a Gaussian-filtered image. For example, FIG. 4 shows an edge region profile and second derivative 404 for a single edge point as located between the double edge points of the edge region 402. In the example of FIG. 4, the location of an edge is in the middle of the region. As a result, the local structure is described as a single zero-crossing edge with a scale or width parameter as indicated in edge region 402. However, since the scale or width of an edge area varies arbitrarily in natural images, such description lacks precision, which can lead to performance loss.

As shown in FIG. 4, double edge points separate the whole region 402 into three sub-regions (left of edge, edge and right of edge). Each of these sub-regions is relatively smooth without large discontinuities in intensity (e.g., for the grayscale example of FIG. 4). As described herein, regardless of the types of edge detection used (e.g., filters or other edge detection techniques), the steps of down-sampling (e.g., block 230) or up-sampling (e.g., block 280) should operate in image sub-regions where a sub-region does not cross an edge. Accordingly to this approach, edges can be maintained as sharp as possible.

Edge Selection

The edges extracted from an original image can reduce the distortion of an up-sampled image, while the number of bits to encode them should also be considered. An exemplary edge selection process 214 uses a rate-distortion criterion to determine the efficiency of an edge. The rate-distortion criterion can be formulated as follows:

$$\text{priority} = \frac{\Delta\text{Distortion}}{\Delta\text{Rate}} = \frac{D_{no\_edge} - D_{edge}}{R_{edge}}$$

where $D_{edge}$ is the distortion between the original image and the up-sampled image with the assistance of a certain edge, which is discussed further below, and $R_{edge}$ is the number of bits needed to encode the edge. For to this approach, higher priority of an edge leads to higher coding performance. According to required quality of the reconstruction image, several edges with higher priorities are preferentially selected as the high-frequency part of the image.

Down-Sampling/Up-Sampling with Edges

Figure 5:
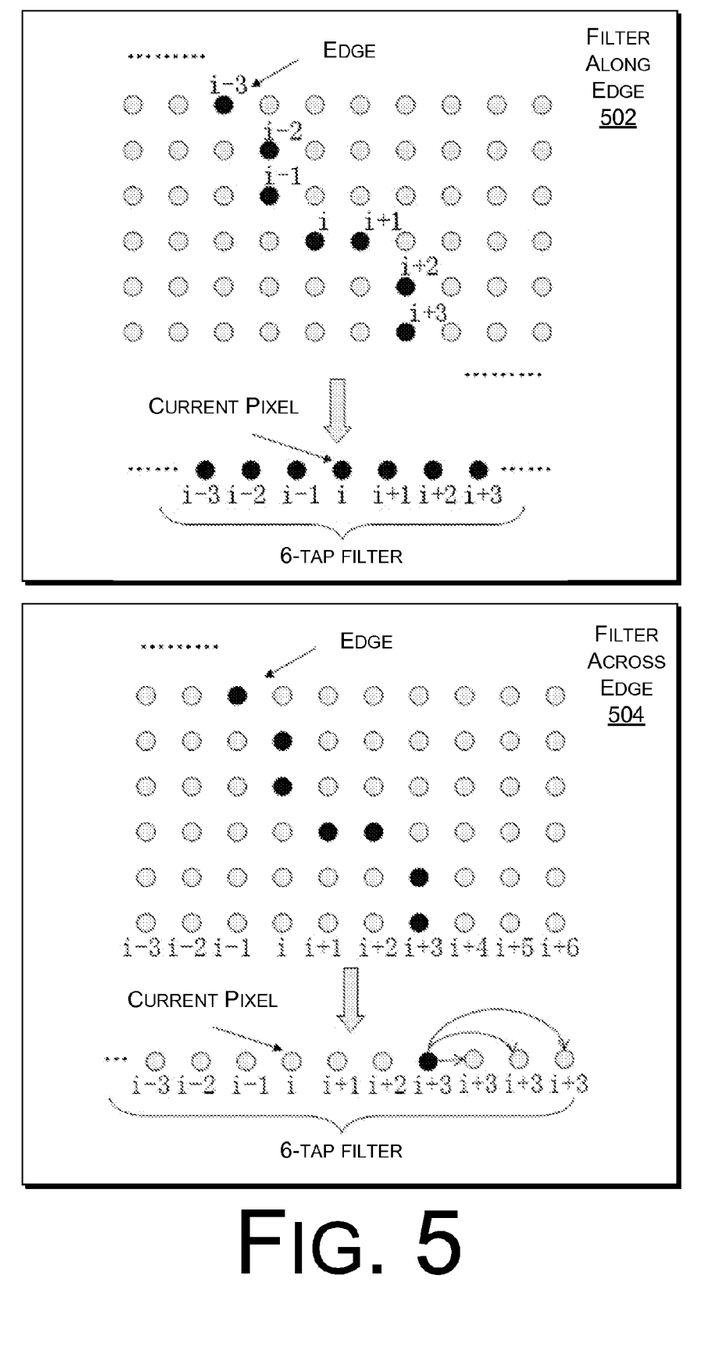
FIG. 5 is a diagram of a 6-tap filter applied along an edge and a 6-tap filter applied across an edge.

FIG. 5 shows various aspects of down-sampling and up-sampling where a filter operates along an edge 502 and where a filter operates across an edge 504. Although these edges are discontinuities in an image, they are smooth along the contours. That is, pixels on edges can be recovered by their neighboring pixels on the same edge. In fact, they can be down-sampled or up-sampled with the 6-tap filters adopted by the H.264 and MEPG-4 Advanced Video Coding (AVC) ITU-T standards, but along edge direction 502. Noting that the MPEG-4 Scalable Video Coding (SVC) standard is not yet completed but it is expected to specify the same 6-tap filters for at least the luma components.

With respect to non-edge pixels, these pixels locate in the smooth regions between two edges and they are down-sampled or up-sampled with the 6-tap filter as mentioned. When the filter crosses an edge, it will be cut and the pixel values within this area will be extended, as shown in the filter across edges schematic 504 of FIG. 5.

Edge Encoding

Figure 6:
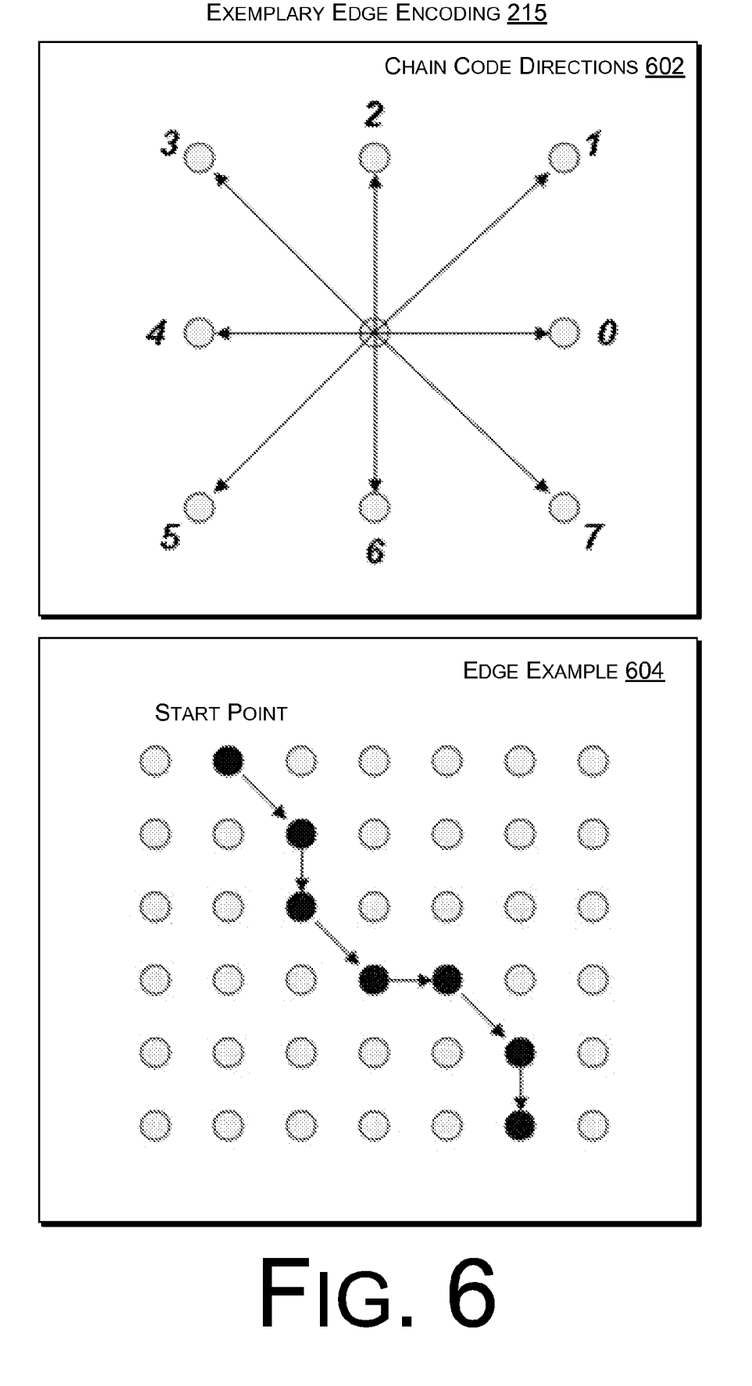
FIG. 6 is a diagram of an exemplary technique for edge encoding that uses chain coding directions to code an edge.

FIG. 6 shows two schematics 602, 604 for the exemplary edge encoding 215 of FIG. 2. A chain code directions schematic 602 shows various directions for forming a chain while an edge example schematic 604 shows how a chain is formed from a start point with various links that conform to the directions 602. Due to the strong directional correlations between the two edge images, chain coding is used to describe an edge. A chain code is defined from 0 to 7 and assigned to eight neighboring points of current pixel, starting from the right one. This is illustrated in the edge example 604. An arbitrary edge description includes the position of the start point and a sequence of chain codes from the first direction to the end. For example, the edge in the schematics 502, 504 of FIG. 5 can be represented by the position of the start point and a chain code sequence 7-6-7-0-7-6 (i.e., a sequence corresponding to the chain directions of 602).

After generating chain code sequences for all the selected edges, the "edge image" is separated into two parts: one part is the chain code sequence of each selected edge, which can be encoded by context-based adaptive arithmetic coding; and the other part is the start points of all the edges, which can be represented by a binary map. As explained below, each point in this map indicates in binary code whether the point is a start point "1" or not "0".

Context-Based Adaptive Arithmetic Chain Encoding

To build context models for arithmetic coding, two aspects are considered. First, consideration of what contexts are available and useful; and, second, consideration of how many context models are needed and the probability distribution for each context model.

Suppose "C" is the current chain code, $P_0$ is the previous one, and $P_1$ is the one before $P_0$. From the edge image shown in FIGS. 2 and 3, most edges have strong directionality and continuity. Therefore, $P_0$ and $P_1$ can be good predictions for C. The third context is "L", which is the direction predicted by the low-resolution image.

Figure 7:
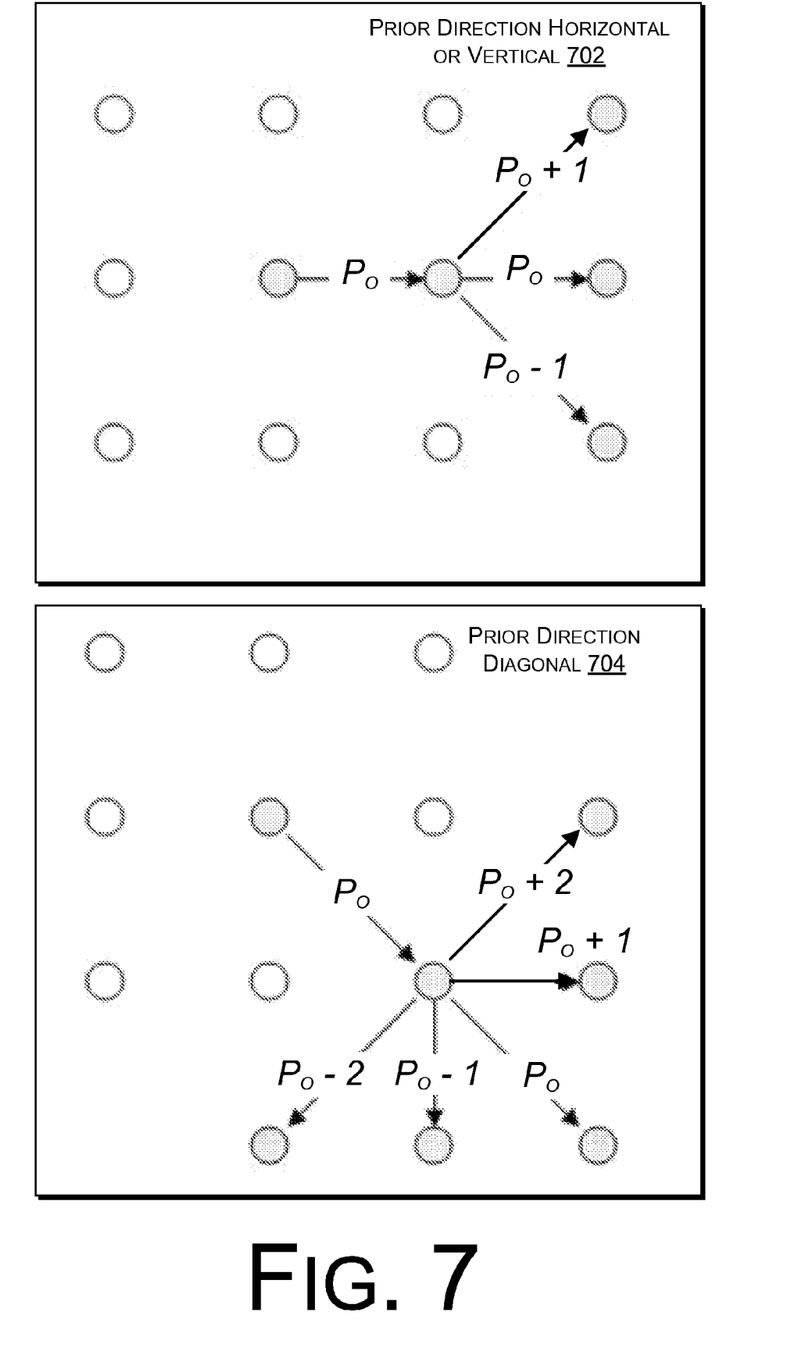
FIG. 7 is a diagram of possible edge chain code directions for two different scenarios.
Figure 8:
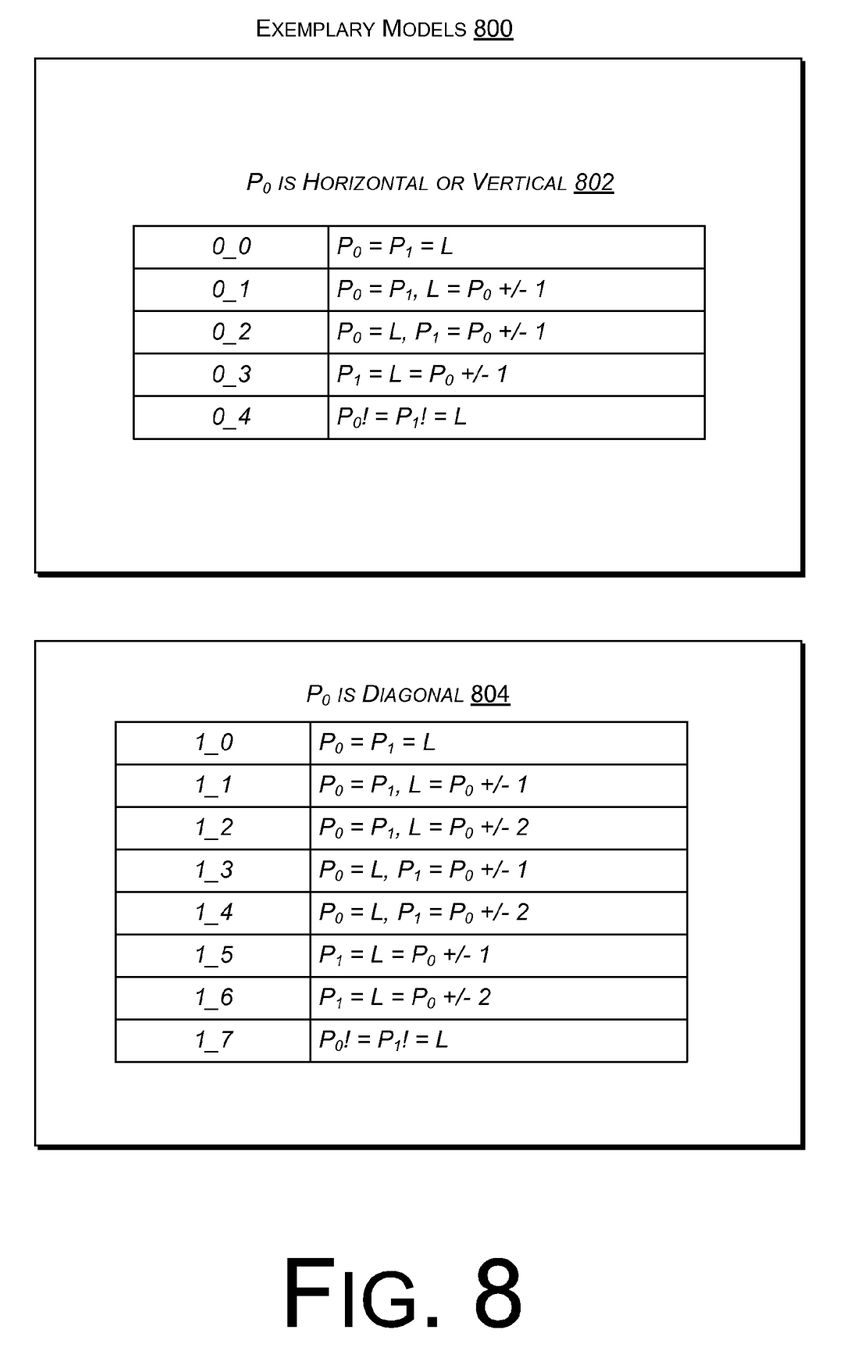
FIG. 8 is a pair of tables that provide information for exemplary models that can chain code edge information.

FIG. 7 shows two schematics 702, 704 to illustrate some characteristics of chain coding. The schematic 702 pertains to instances where a prior direction is horizontal or vertical directions and the schematic 704 pertains to instances where a prior direction is diagonal (see, e.g., the chain code directions 602 of FIG. 6). Where the edge width has been set to one-pixel, all the edges are one-pixel wide and a chain can not go back to the pixels which have been already passed through; meaning that after one pixel in a chain determines which one of its 8-neighboring pixels provides its next link direction, the other 7 neighboring pixels are not available for selection. Therefore, per the schematic 702, if $P_0$ is horizontal or vertical, C is limited to three possible values: $P_0, P_0+1, P_0-1$. In the case that $P_0$ is diagonal, per the schematic 704, C is limited to five possible values: $P_0, P_0+1, P_0-1, P_0+2, P_0-2$. For this reason, the exemplary context models are classified into two categories. Furthermore, according to the statistical data, some models can be merged in each category. For example, if $P_0$, $P_1$ and L are all equal to a certain direction "a", C is most likely to be "a". The exemplary chain coding technique results in 13 models, which are shown in FIG. 8. Specifically, FIG. 8 shows exemplary chain coding models 800 categorized as models 0_0 to 0_4 for horizontal or vertical prior directions 802 and models 1_0 to 1_7 for diagonal prior directions 804.

Quad-Tree Geometry Coding for Start Point Map

Figure 9:
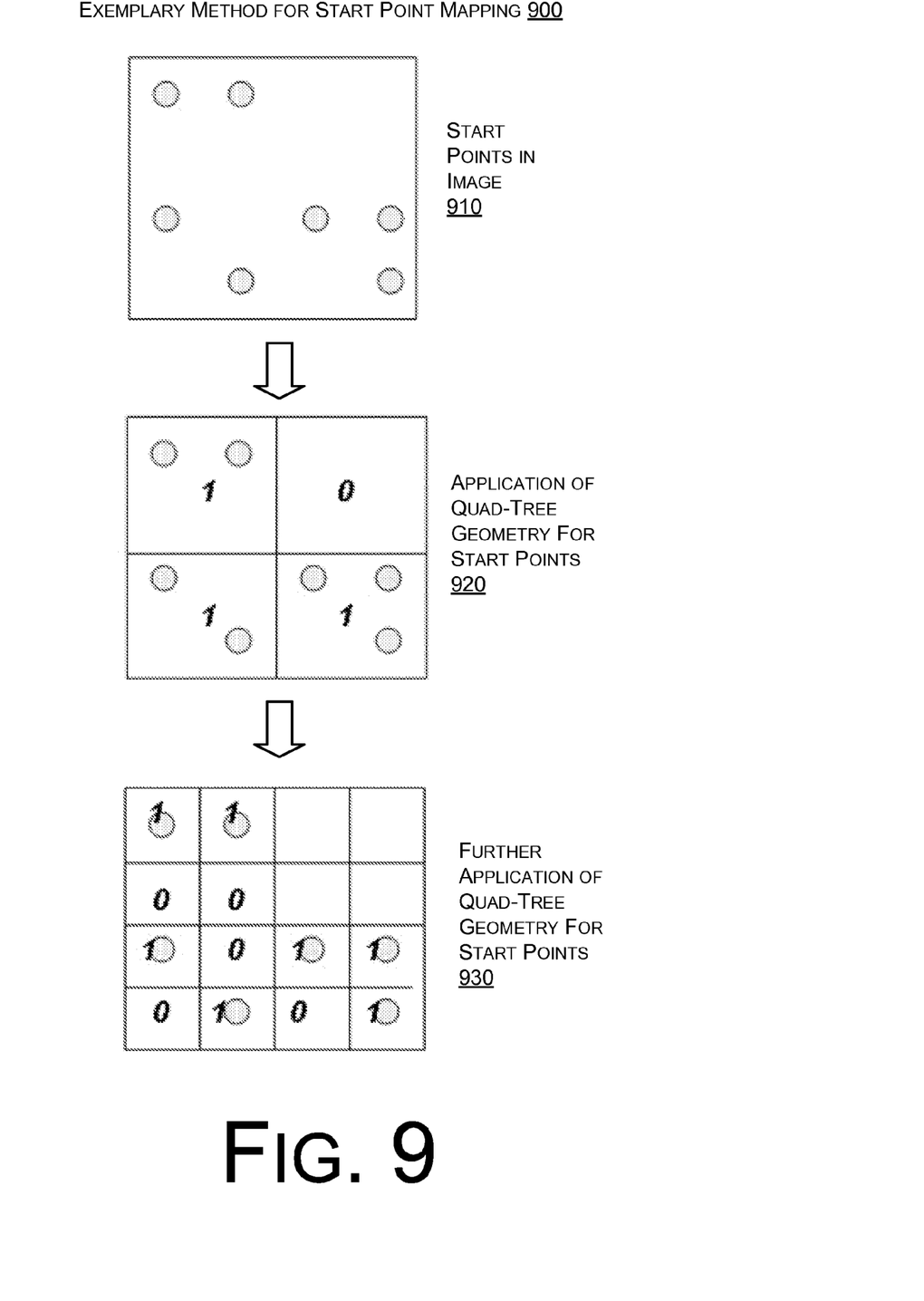
FIG. 9 is a diagram of an exemplary method for start point mapping.

FIG. 9 shows an exemplary technique 900 for using quad-tree geometry coding for a start point map. In various conventional approaches, a start point for each edge is encoded by fixed-length bits. However, as image size has grown with increased processing speed and decreased memory cost, the number of bits has become larger and larger. To address this issue, an exemplary binary map is used to represent all the start points for an image. In the example of FIG. 9, the method 900 uses a quad-tree geometry algorithm to encode a start point map. An image map 910 illustrates start points in the image where each start point corresponds to the beginning of a selected edge. The image map 910 is represented in binary form where a pixel position is, for example, either "1" or "0" to indicate whether that position corresponds to a start point.

The image map 910 is then divided into four sections according to quad-tree geometry coding to produce the image map 920 where one bit for each section is used to indicate whether that section contains at least one start point or not: "1" yes and "0" no. If a section does contain at least one start point, that section is recursively divided into smaller sections until it reaches end blocks of a predetermined size; otherwise, a section need not be further divided. End blocks sizes may be selected as desired, for example, end blocks may be one or more of sizes 2×2, 2×3, 3×2, and 3×3 (e.g., in pixels). Once end block resolution has been reached, in each block, if it contains only one start point, the index of the point is encoded. Otherwise, the whole bit pattern of the block is encoded to ensure information for all start points is retained.

Example Computing Device

Figure 10:
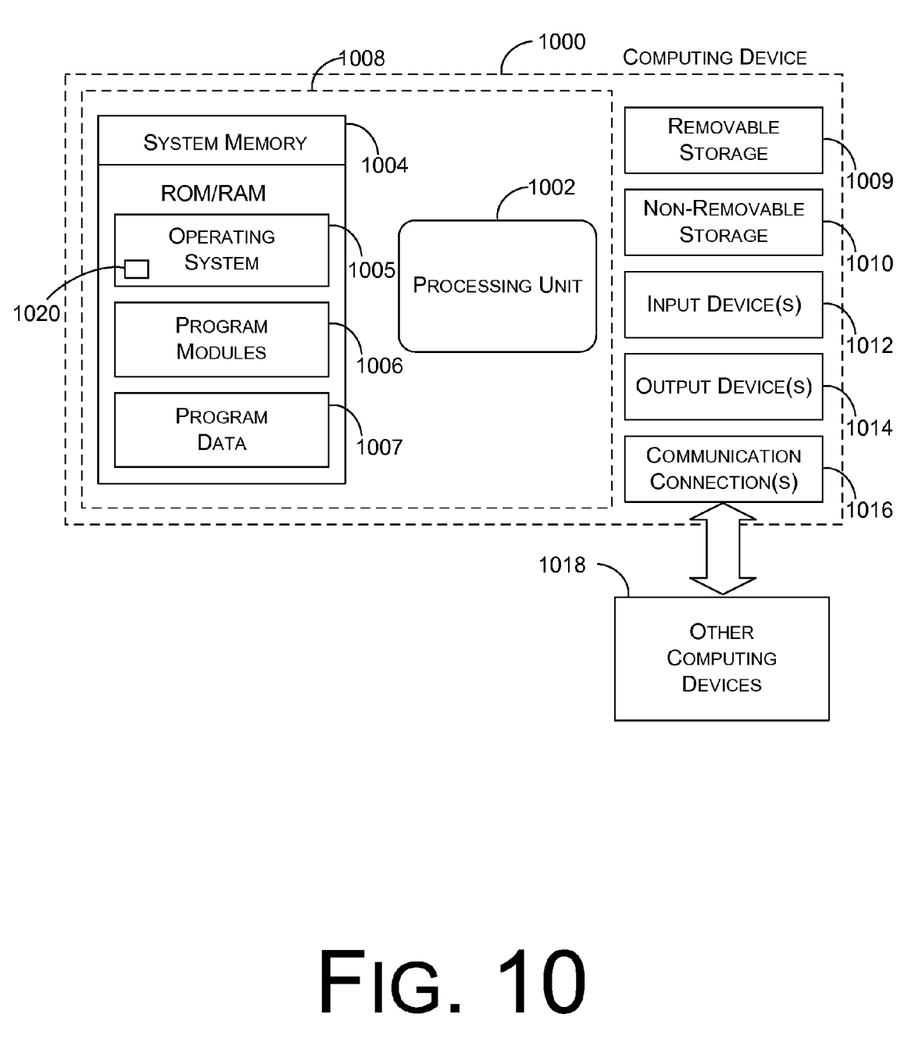
FIG. 10 is a diagram of various components of an exemplary computing device that may be used to implement part or all of various exemplary methods discussed herein.

FIG. 10 shows various components of an exemplary computing device 1000 that may be used to implement part or all of various exemplary methods discussed herein.

The computing device shown in FIG. 10 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 10, an exemplary system for implementing an exemplary encoding and/or decoding process includes a computing device, such as computing device 1000. In a very basic configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination of the two. System memory 1004 typically includes an operating system 1005, one or more program modules 1006, and may include program data 1007. This basic configuration is illustrated in FIG. 10 by those components within dashed line 1008.

The operating system 1005 may include a component-based framework 1020 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1600 may also have input device(s) 1012 such as keyboard, mouse, pen, voice input device, touch input device, etc. Output device(s)

1014 such as a display, speakers, printer, etc. may also be included. These devices are well know in the art and need not be discussed at length here.

Computing device 1000 may also contain communication connections 1016 that allow the device to communicate with other computing devices 1018, such as over a network. Communication connection(s) 1016 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

The invention claimed is:

1. A method for encoding an image, implemented at least in part by a computing device, the method comprising:
   receiving image data;
   detecting edges in the image data;
   selecting at least some of the edges by applying a rate-distortion criterion to each of the edges, the rate-distortion criterion for an edge comprising a priority value for the edge, the priority value based on an edge distortion value, a no-edge distortion value, and a value for a number of bits needed to encode the edge;
   encoding the selected edges as selected edge information;
   down-sampling the image data and encoding the down-sampled image as down-sampled image information; and
   multiplexing the selected edges information and the down-sampled image information.

2. The method of claim 1 wherein the detecting edges comprises filtering the image data.

3. The method of claim 1 wherein the encoding the selected edges comprises chain coding.

4. The method of claim 3 wherein, for a horizontal or vertical prior chain direction, a next chain direction corresponds to one of three chain directions.

5. The method of claim 3 wherein, for a diagonal prior chain direction, a next chain direction corresponds to one of five chain directions.

6. The method of claim 3 wherein the chain coding comprises models for a horizontal or vertical prior chain direction and models for a diagonal prior chain direction.

7. The method of claim 3 wherein the chain coding codes an edge as a series of chain direction values.

8. The method of claim 1 wherein the encoding the selected edges comprises binary mapping of start points wherein each edge comprises a start point represented by a binary value.

9. The method of claim 8 wherein the binary mapping comprises dividing regions of an image using quad-tree geometry.

10. The method of claim 1 wherein the encoding the selected edges comprises coding each selected edge as a start point and a series of chain direction values.

11. The method of claim 1 wherein the multiplexing comprises storing the selected edges information and the down-sampled image information as an encoded image file.

12. The method of claim 11 wherein the encoded image file comprises selected edges information in a data structure accessible by a search engine.

13. The method of claim 1 further comprising storing the selected edges information for the image in a file and indexing the file based at least in part on the selected edges information.

14. The method of claim 1 further comprising decoding the multiplexed selected edges information and down-sampled image information to generate an up-sampled image having a resolution greater than the down-sampled image.

15. A method for encoding edges in an image, implemented at least in part by a computing device, the method comprising:
   receiving image data;
   detecting edges in the image data;
   selecting at least some of the edges by applying a rate-distortion criterion to each edge, the rate distortion criterion for an edge comprising a priority value for the edge, the priority value based on an edge distortion value, a no-edge distortion value, and a value for a number of bits needed to encode the edge; and
   encoding the selected edges as selected edge information that comprises a binary start points map and chain codes.

16. The method of claim 15 further comprising indexing the image based on the selected edge information that includes start point information and chain direction information of the selected edges.

17. A computing device comprising:
   a processor;
   memory;
   control logic implemented at least in part by the processor to perform an act of detect edges in image data, to select at least some of the edges by applying a rate-distortion criterion to each edge, the rate distortion criterion for an edge comprising a priority value for the edge, the priority value based on an edge distortion value, a no-edge distortion value, and a value for a number of bits to encode the edge, and to encode the selected edges as selected edge information wherein the selected edge information comprises a binary start points map and chain codes.

18. The method of claim 9, wherein the dividing comprises terminating division of a region at a predetermined end block size specified in pixels.

19. The method of claim 15 further comprising:
down-sampling the image data and encoding the down-sampled image as down-sampled image information; and
multiplexing the selected edges information and the down-sampled image information.

20. The method of claim 19 wherein the multiplexing comprises storing the selected edges information and the down-sampled image information as an encoded image file.

21. The method of claim 20 wherein the encoded image file comprises selected edges information in a data structure accessible by a search engine.

22. The method of claim 19 further comprising decoding the multiplexed selected edges information and down-sampled image information to generate an up-sampled image having a resolution greater than the down-sampled image.

23. The computing device of claim 17 wherein the control logic is further implemented to perform an act of storing the selected edges information for the image in a file and indexing the file based at least in part on the selected edges information.

24. The computing device of claim 17 wherein the control logic is further implemented to performs acts that include:
down-sampling the image data and encoding the down-sampled image as down-sampled image information; and
multiplexing the selected edges information and the down-sampled image information.

25. The computing device of claim 24 wherein the multiplexing comprises storing the selected edges information and the down-sampled image information as an encoded image file.

26. The computing device of claim 25 wherein the encoded image file comprises selected edges information in a data structure accessible by a search engine.

27. The computing device of claim 24 wherein the control logic is further implemented to perform an act of decoding the multiplexed selected edges information and down-sampled image information to generate an up-sampled image having a resolution greater than the down-sampled image.

* * * * *